9535X
S. King,
Dressing Staves.
Patented Mar. 23, 1836.
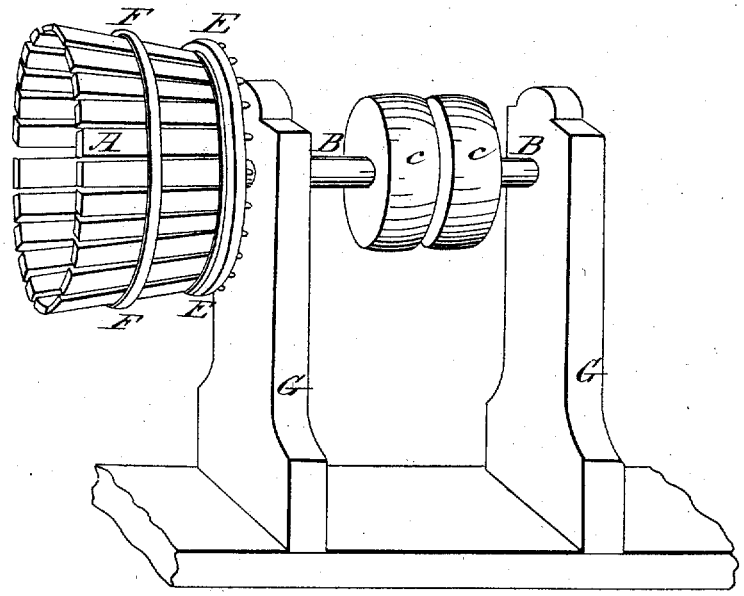
AM. PHOTO-LITHO. CO. N.Y. (OSBORNE'S PROCESS)

Mar. 23. 1836 113.

Sumner King 9535X machine for working off the ends, & smoothing casks

The schedule referred to in these Letters Patent and making part of the same containing a description in the words of the said Sumner King himself of his improvement in the machine for working off the ends and smoothing casks &c. &c.

To all, to whom these Presents shall come

Be it Known that I, Sumner King, of Suffield in the county of Hartford and State of Connecticut, have invented a new and useful improvement in working off the ends, and smoothing casks of all descriptions, and that the following is a full and exact description of the construction and operation of the said machine as invented or improved by me —

To consist of a revolving grapple tub, or any other grapple to secure the cask, to be placed upon an arbour, the arbour to have two pullies on it, one tight for a band to pass round for the power of driving the tub, and the one loose to let the band on to when the tub is to be stopped — The arbour to have a plate or collar on one end of sufficient dimensions to admit of a tub being fastened on to it, with bolts passing through the collar and bottom of the tub.

The tub to have one end of the staves fastened to the bottom, the other end loose, so as to expand so as admit one end of the cask that is to be worked or turned into it, and make fast by driving on a hook KEY. When the cask is made fast in the tub it revolves, and tools are held on to work it off — consisting of a heveller, a stock howel, a crose and a plane. The arbour to be diurnd in a frame, or floor of the building and to be propelled by any power.

What I claim as my invention or improvement is the revolving grapple tub, that secures the casks

Witnesses
John L. King
Gilbert King

[illegible]

Sumner King —

[illegible]